Figure 1:
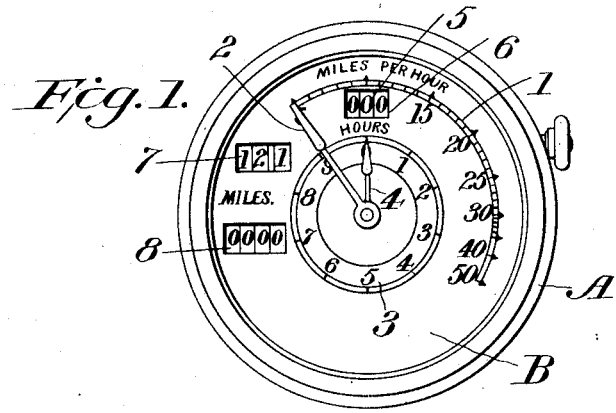

R. SHIPMAN.
INSTRUMENT FOR INDICATING SPEED AND RUNNING TIME OF MACHINES.
APPLICATION FILED APR. 5, 1910.

1,022,801.

Patented Apr. 9, 1912.
6 SHEETS—SHEET 1.

Witnesses
Inventor
Ralph Shipman
By Watson Boyden
Attorneys

R. SHIPMAN.
INSTRUMENT FOR INDICATING SPEED AND RUNNING TIME OF MACHINES.
APPLICATION FILED APR. 5, 1910.
1,022,801.
Patented Apr. 9, 1912.
6 SHEETS—SHEET 2.
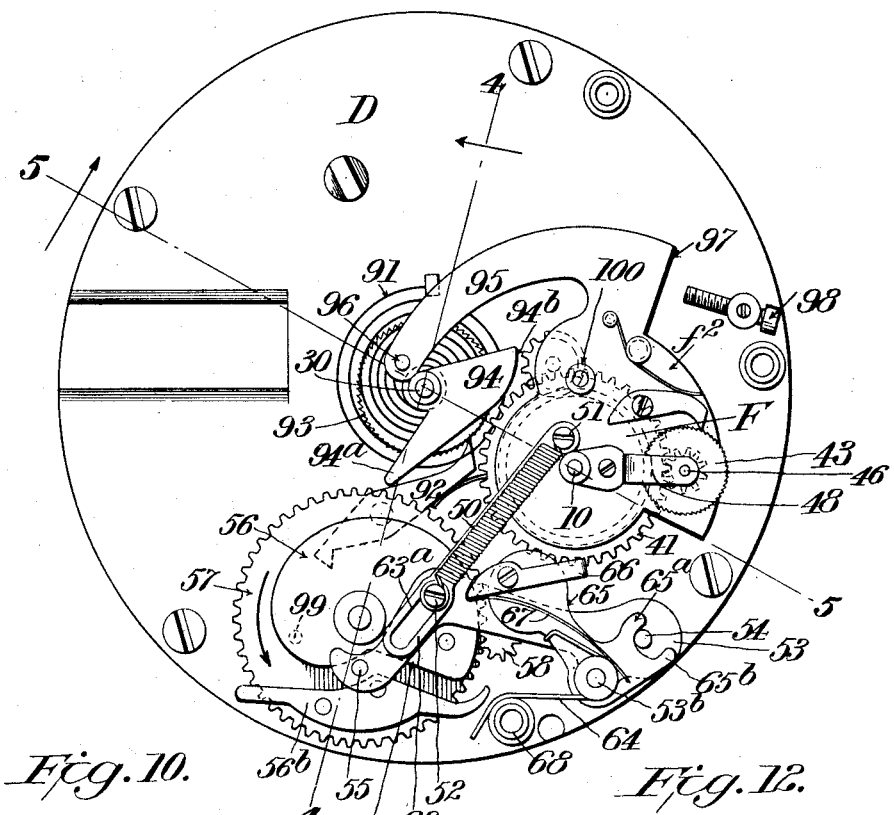
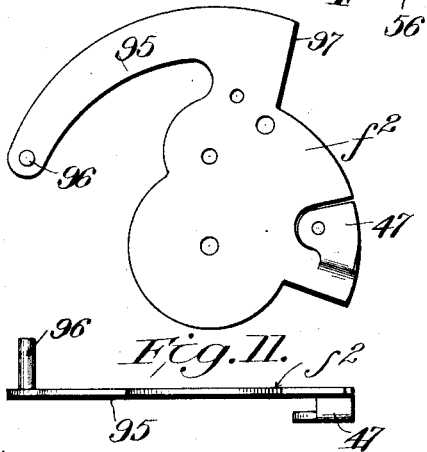
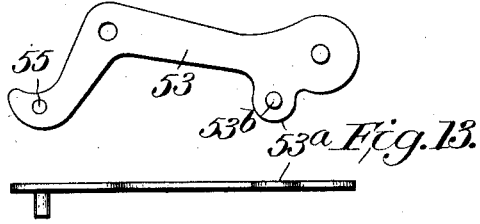
Witnesses
Inventor
Ralph Shipman
By Watson & Boyden
Attorneys R. SHIPMAN.
INSTRUMENT FOR INDICATING SPEED AND RUNNING TIME OF MACHINES.
APPLICATION FILED APR. 5, 1910.

1,022,801.

Patented Apr. 9, 1912.

6 SHEETS—SHEET 3.

Witnesses

Inventor
Ralph Shipman
By Watson & Boyden
Attorneys

R. SHIPMAN.
INSTRUMENT FOR INDICATING SPEED AND RUNNING TIME OF MACHINES.
APPLICATION FILED APR. 5, 1910.
1,022,801.
Patented Apr. 9, 1912.
6 SHEETS—SHEET 4.
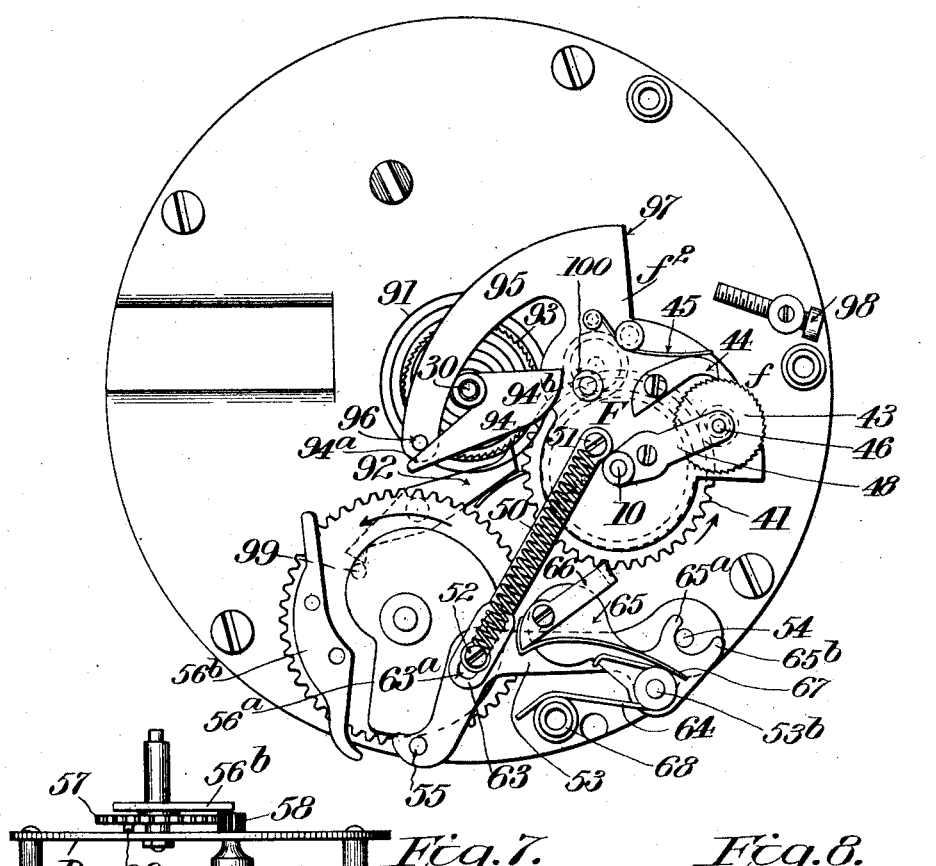
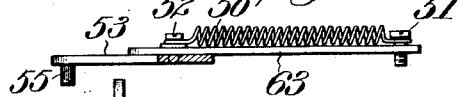
Witnesses
Inventor
Ralph Shipman
By
Watson Boyden
Attorneys R. SHIPMAN.
INSTRUMENT FOR INDICATING SPEED AND RUNNING TIME OF MACHINES.
APPLICATION FILED APR. 5, 1910.

1,022,801.

Patented Apr. 9, 1912.

6 SHEETS—SHEET 5.

Witnesses
C. N. Walker
J. T. Walker

Inventor
Ralph Shipman

By
Watson & Boyden
Attorneys

R. SHIPMAN.
INSTRUMENT FOR INDICATING SPEED AND RUNNING TIME OF MACHINES.
APPLICATION FILED APR. 5, 1910.
1,022,801.
Patented Apr. 9, 1912.
6 SHEETS—SHEET 6.
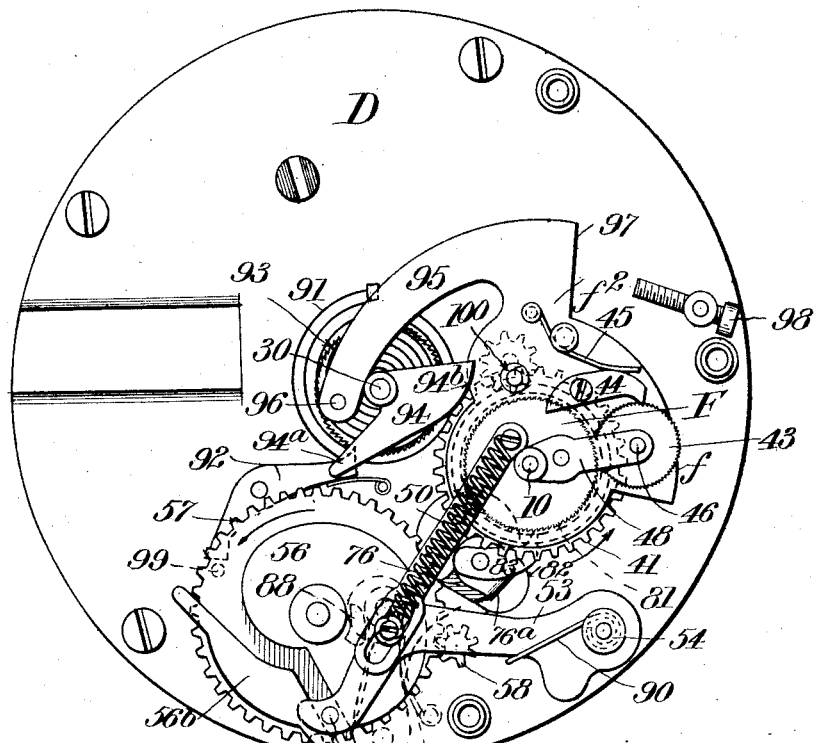

UNITED STATES PATENT OFFICE.

RALPH SHIPMAN, OF SUNBURY, PENNSYLVANIA.

INSTRUMENT FOR INDICATING SPEED AND RUNNING TIME OF MACHINES.

1,022,801. Specification of Letters Patent. Patented Apr. 9, 1912.

Application filed April 5, 1910. Serial No. 553,610.

*To all whom it may concern:*

Be it known that I, RALPH SHIPMAN, a citizen of the United States, residing at Sunbury, in the county of Northumberland and State of Pennsylvania, have invented certain new and useful Improvements in Instruments for Indicating Speed and Running Time of Machines, of which the following is a specification.

In my Patent No. 903,793 I have shown an indicator for indicating the speed and actual running time of a machine, such as a vehicle, in which is embodied a clock mechanism having a main spring which is placed under tension and relaxed by the machine, during certain short intervals in the travel of the machine, the main spring, when put under tension, being capable of operating the mechanism for only a short interval of time, so that the clock mechanism will operate while the machine is in motion and stop approximately when the machine stops. The mechanism indicates the average speed made by the machine or vehicle during a unit of distance and also indicates the actual running time of the machine during a trip or any series of trips.

The present invention comprises means for applying auxiliary force to the clock mechanism to drive the same during the intervals when the main spring is relaxing or relaxed, so that the clock mechanism will operate with a constantly applied force while the vehicle or machine to which the instrument is applied is in motion. In the present invention, also, certain improvements are included whereby the operation of the device is improved and some of the parts shown in my prior patent are dispensed with.

Figure 2:
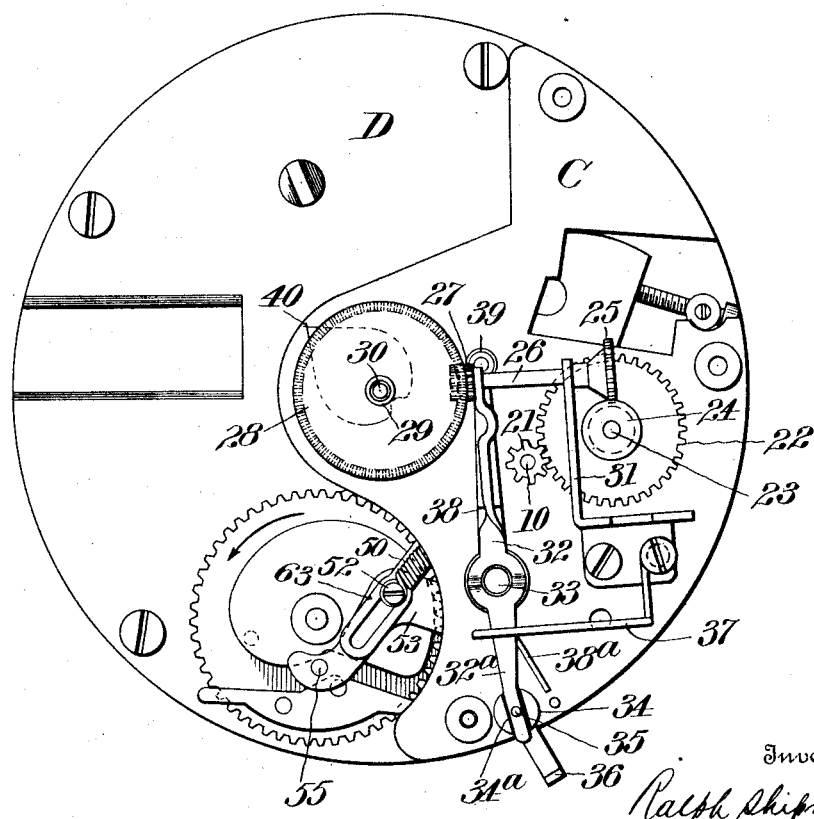
Figure 4:
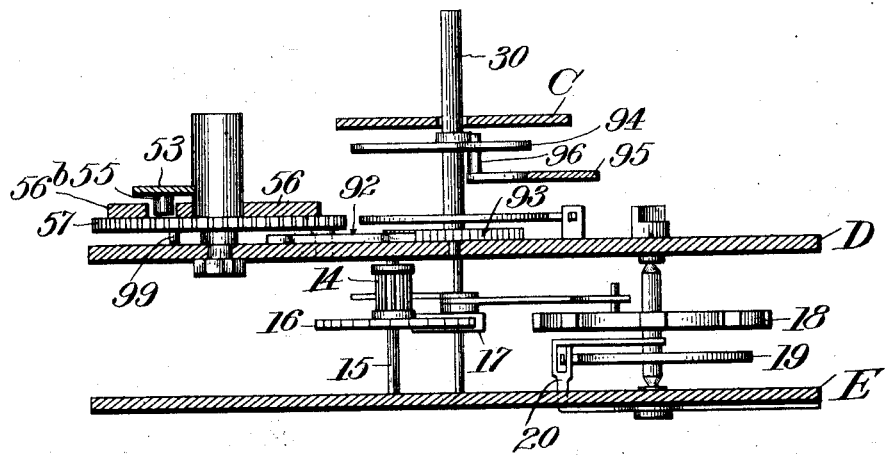
Figure 5:
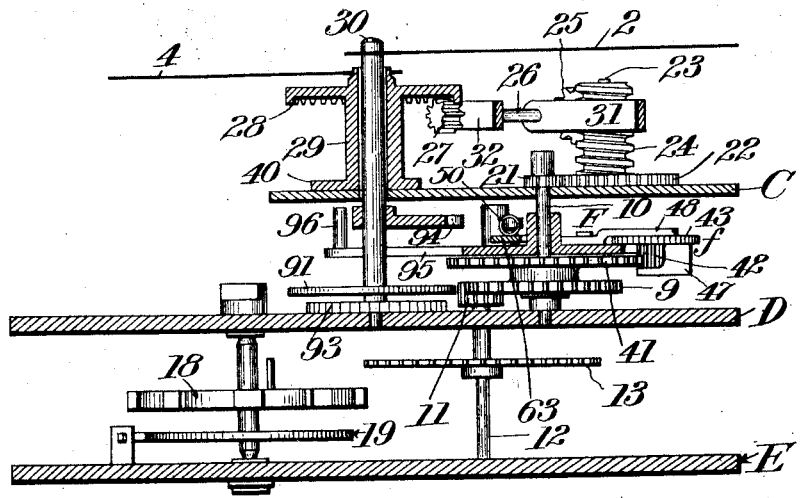
Figure 9:
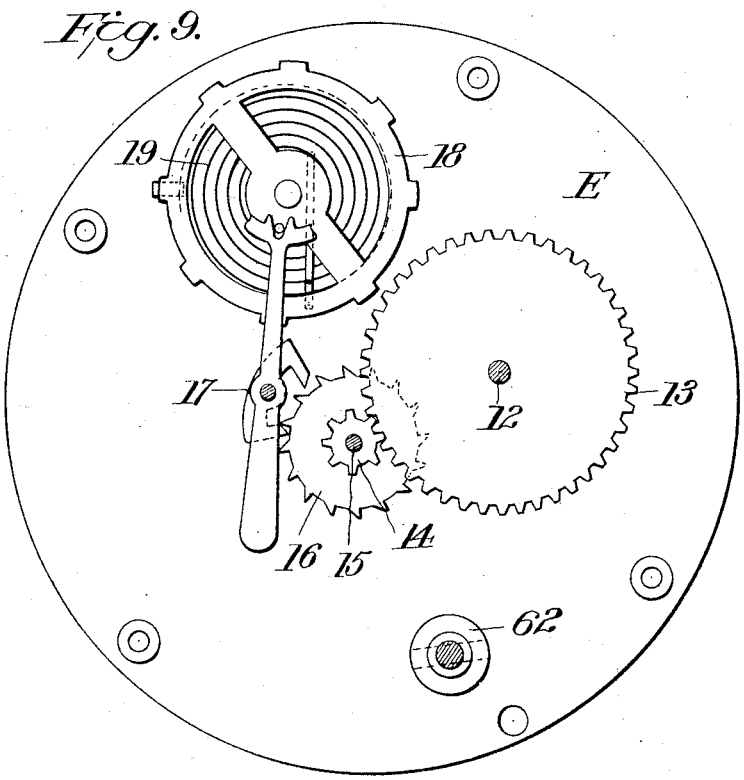
Figure 9A:
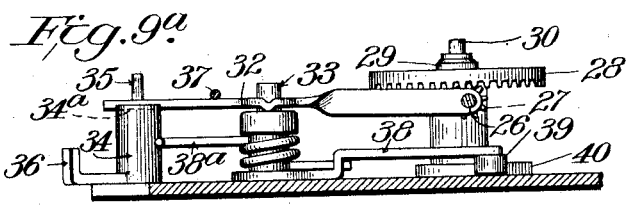

In the accompanying drawing which illustrates my invention, Figure 1 is a face view, on a small scale, of the instrument, complete with casing; Fig. 2 is a top plan view of the instrument, removed from the casing, the dial plate, time and speed indicating hands, and the time and distance registering mechanisms being omitted; Fig. 3 is a plan view of the mechanism between the uppermost plate C and the intermediate plate D; Fig. 4 is a section on the line 4—4 of Fig. 3, looking in the direction of the arrow; Fig. 5 is a section on the line 5—5 of Fig. 3, looking in the direction of the arrow; Fig. 6 is a plan view, similar to Fig. 3, but showing the parts in different relative positions; Fig. 7 is a side view of the connections from the instrument to the tappet on a vehicle wheel; Fig. 8 is a side view of the main spring for winding the clock mechanism and the link for resetting the clutch member; Fig. 9 is a plan view of the clock train between the supporting plates D and E; Fig. 9ª is a side view of the levers 32 and 38, looking from right to left in Fig. 2; Figs. 10 and 11 are, respectively, plan and edge views of the member which carries the clutch devices operated by the main spring; Figs. 12 and 13 are, respectively, side and edge views of the lever, operated by the snail cam and with which the main spring connects; Figs. 14 and 15 are, respectively, plan and edge views of the lever which carries the auxiliary clutch or pawl for operating the clock train while the main spring is relaxing or relaxed; Fig. 16 is a plan view of the parts shown in Figs. 3 and 6, with a different form of mechanism for applying force to the clock train while the main spring is relaxing; Fig. 17 is a side view of the auxiliary devices shown in Fig. 16 for applying force to the clock train; Fig. 18 is a perspective view of the two co-acting levers shown in Figs. 16 and 17; and, Fig. 19 is a plan view of said levers connected together.

Referring to the drawing, A indicates a suitable cylindrical casing within which is suitably supported a dial plate B having arranged thereon a speed indicating scale 1 which is traversed by a speed indicating hand 2, and a time indicating scale 3 which is traversed by an hour hand 4. This latter hand, as hereinafter explained, is movable by a clock mechanism only while the vehicle is in operation, so that the hand will indicate only the actual running time of the machine. The scale 3 has ten division marks, for hours, so that the hand will indicate upon the scale the actual running time of the vehicle for one or more trips made during a period of not more than ten hours. The total running hours of the machine, above ten, are shown on a register 5 which is exhibited through an opening 6 in the dial plate. The distance in miles, for a day's run or a single trip, is indicated on a register 7, and the total miles for a series of trips on a register 8, both exhibited through suitable openings in the dial plate.

As the registers 5, 7 and 8 are well known devices for adding and exhibiting the miles and hours, the details of these registers and their connections are omitted from the drawings.

The operating mechanism of the instrument is supported between three parallel plates C, D and E. The gear 9, secured to a staff or spindle 10, is the main or driving gear of an ordinary clock train, said clock train comprising a pinion 11 mounted upon a staff or spindle 12 which carries a gear 13 meshing with a pinion 14 secured to a shaft 15 which carries an escapement wheel 16, the latter being controlled by a pallet 17 which in turn is governed by a balance wheel 18, hair spring 19, and a regulator 20, engaging the hair spring. The staff 10, to which the main gear 9 is secured, carries, above the plate C, a pinion 21 which meshes with a gear 22, journaled upon a stud 23. A worm gear 24, secured to the gear 22 meshes with a pinion 25 which is secured to one end of a horizontal shaft 26 and a pinion 27 upon the opposite end of said shaft meshes with a gear 28, which is integral with a sleeve 29, loosely mounted upon a shaft 30, the latter being journaled in plates C and D. The hand 4, for indicating time upon the scale 3, is secured to the sleeve 29 and turns with the gear 28. The ratio of gearing is such that the hand 4 will make one revolution in ten hours providing the clock mechanism is continuously in operation during that time.

One end of the shaft 26 is journaled in a fixed arm 31 and the other end of the shaft is journaled in one arm of a lever 32, said lever being arranged to rock vertically on a support 33. The shorter arm 32ª of the lever normally rests within a groove 34ª in a stud 34 which is secured to a spindle 35, the stud and spindle being rotatable by means of a short lever 36. When the shorter arm of the lever 32 rests within the groove in the stud 34, the pinion 27 engages the gear 28. A spring 37 bearing on the shorter arm of the lever 32 presses said arm against the stud 34 and tends to hold the pinion in engagement with the gear. When the stud 34 is turned from normal position, the shorter arm of the lever 32 is raised and the longer arm is depressed, thus throwing the pinion 27 out of engagement with the gear 28. When the stud 34 is returned to its normal position the pinion and gear reengage. These devices for throwing the pinion into and out of gear are provided in order that the time indicating hand 4 may be set back to zero, when desired, by means of a horizontally movable lever 38, journaled upon the support 33 and carrying at one end a roller 39 adapted to engage a heart-shaped cam 40 upon the sleeve 29, said cam being shown in dotted lines in Fig. 2. The lever 38 has a short arm 38ª by which the lever may be swung into and out of engagement with the cam. Devices of this kind for disengaging the gears and resetting the time indicating hand are old and well known and are not a part of the present invention.

The clock mechanism heretofore described is operated by means of a clutch mechanism, comprising a toothed clutch wheel 41, rigidly secured to the spindle 10 which carries the main gear 9 of the clock mechanism, and a clutch member F, journaled on the same spindle and carrying devices $f$ adapted to interlock with the clutch wheel 41 when the member F is rotated in one direction and to move freely past the teeth on the clutch wheel when said member is moved in the opposite direction. The clutch devices $f$ comprise a pinion 42, having teeth which mesh with the teeth of the clutch wheel 41, a ratchet wheel 43, rigidly connected to the pinion 42 and a pawl 44 which is pressed by a spring 45 into engagement with the ratchet wheel. The ratchet wheel, as shown, is of comparatively large diameter and has a large number of fine teeth so that the pawl will hold the ratchet wheel and pinion against backward rotation with little or no back-lash or lost motion between the pawl and the ratchet teeth. The ratchet wheel and pinion are supported upon a stud 46 which is held at its lower and upper ends in a depressed arm 47 of the plate $f^2$ (Figs. 10 and 11) and an arm 48 secured to said plate. For convenience the plate and the ratchet mechanism connected thereto are termed a clutch member and designated, as a whole, by the reference character F. It will be seen that when the clutch member F is rotated in the direction of the arrow, Fig. 6, the clock mechanism will be operated thereby and when said member is turned in the opposite direction the clutch devices $f$ will slip past the teeth on the clutch wheel 41 without actuating the clutch wheel 41.

A helical spring 50, which is the main spring for operating the clock mechanism, is connected between a pin 51 on the plate $f^2$ and a pin 52 on a lever 53 arranged upon a pivot pin 54 between the plates C and D. A pin 55 upon the free end of said lever bears against a snail cam 56 which is secured to a gear wheel 57 driven by a pinion 58, which pinion is, in turn, operated by a flexible shaft 59 upon which is mounted a star wheel 60 arranged in operative relation to a tappet 61, which tappet, it will be understood, is secured to the wheel of a vehicle or a moving part of any other machine whose running time or speed is to be determined. The pinion 58 is secured to a short coupling 62, rotatably mounted between the plates D and E of the instrument, to which coupling the flexible shaft 59 may be readily attached.

It will be seen that the movement of the vehicle, or other machine to which the instrument is applied, will cause the snail cam to rotate once each time the machine moves a given distance, and as the pin 55 on the lever 53 slides along the surface of the cam from the low part, as shown in Fig. 3, to the high part, as shown in Fig. 6, tension is applied to the main spring by the movement of the lever and the clutch member F is moved in the direction to operate the clock mechanism. After the machine has moved a given distance, the pin on the lever 53 leaves the high part of the cam and slides down to the low part, and during this movement of the pin 55 and lever 53 the clutch member F is reset to its initial position by a link 63 pivoted at one end to the pin 51 on the plate $f^2$ and having a slot $63^a$ at its opposite end through which the pin 52 on the lever 53 extends. When the lever 53 moves inward the pin 52 engages the link 63 at the inner end of the slot $63^a$ and thus causes the clutch member F to move back to its initial position, whereas when the lever 53 is moved outward by the cam the pin 52 may move forward in the slotted end of the link, to stretch the main spring, without pulling the link forward.

In moving from the lowest to the highest part of the snail cam, the pin 55 is held against the cam both by the main spring and by an auxiliary spring 64, hereinafter referred to. After the high part of the cam has passed the pin 55 the latter enters a groove between the face $56^a$ of said cam and the opposing face of a cam or guard $56^b$, and said guard bears against the pin 55 and returns the lever 53 to its inner position, thus causing said lever to move the link 63 to reset the clutch member F.

While the clutch member F is being reset and the main spring is relaxed, the balance wheel of the clock mechanism keeps said mechanism in motion until tension is again applied to the main spring by the rotation of the snail cam, providing the machine which operates the snail cam is kept in motion and at a speed equal to or greater than the minimum speed which the instrument is designed to indicate. Each time the main spring is relaxed, however, the driving force of said spring is withdrawn from the clock mechanism and this would naturally result in an imperfect operation of the time mechanism, particularly at low speeds of the machine, unless some auxiliary means were provided for applying power to the clock train during the intervals while the main spring is out of commission. An important feature of my present invention is the provision of this auxiliary driving means for the clock train, and in the accompanying drawings I have shown two forms of mechanism for accomplishing this result. In Figs. 3 and 6 the lever 53, pivoted at 54 has a laterally extending lug $53^a$ (Fig. 12) in which is secured a stud $53^b$ and upon said stud is pivoted a bell crank lever 65. One arm of the bell crank lever has two forks $65^a$ and $65^b$ projecting on opposite sides of the pin 54, and arranged at some distance apart, so as to permit of lost motion between the stationary pin 54 and the arms $65^a$ and $65^b$. Upon the other arm of the bell crank lever is pivoted a pawl or detent 66 having a depending arm which is adapted to engage the teeth of the main gear 41 of the clock mechanism. A spring 67 connected to the pawl and bearing against the stud $53^b$ holds the pawl lightly in engagement with the teeth of said gear. The V-shaped spring 64 is coiled around the stud $53^b$ upon the lever 53 and one end of the spring rests against a fixed stud 68 while the other end engages the bell crank lever and normally forces the forked arm $65^a$ thereof against the pivotal stud or shaft 54 which forms a stop to limit the movement of the bell crank lever.

When the lever 53 is moved outward by the snail cam, the bell crank lever swings with it around the pivot pin 54, as a center, the pawl 66 sliding backwardly over the teeth on the wheel 41. When the pin 55 moves from the high to the low part of the cam, the lever 53 is forced inward by the guard $56^b$ thereby allowing the main spring 50 to relax and causing the clutch member F to be reset; but during this inward movement of the lever 53 the pawl 66 engages the teeth on the gear wheel 41, and because of the lost motion between the forked arm of the bell crank lever and the pin 54, the bell crank lever returns to normal position independently of the lever 53, the spring 64 supplying the power for returning the bell crank lever. As the pawl 66 positively engages the teeth on the gear 41, during this return movement of the bell crank lever, it will be evident that the clock mechanism will be impelled by the spring 64 during the time while the lever 53 is moving inward and the main spring 50 is relaxing or relaxed. By properly proportioning the parts the springs 64 and 50 may be arranged to operate alternately so that while the machine to which the instrument is attached is in motion one or the other of said springs will be acting operatively upon the clock train.

In Figs. 16, 17, 18 and 19 another arrangement of device is shown, for applying driving force to the clock train when the main spring is relaxed. In these views, two levers 75 and 76 are pivoted upon a post 77 arranged between the plates D and E. The lever 75 has a pin 78 which extends through a transverse slot 79 in the lever 76, and a spring 80 coiled around the post 77 has one end engaging the stud 78 and the other end engaging one side of the lever 76. The spring tends to swing the levers in opposite directions, but the movement is restrained by the engagement of the pin 78 with the sides 79ª of the slot 79. In addition to the clutch wheel 41 and the main driving gear 9 for the clock mechanism, there is, in the figures just referred to, a ratchet wheel 81 upon the staff 10, said ratchet wheel having a large number of fine teeth. The plate D has an opening 82 cut through it and the lever 76 has an upwardly projecting and over turned flange 76ª which projects through said opening, and a pawl 83 upon said flange engages the teeth on the ratchet wheel 81. This pawl is secured to a pivot pin 84 which is journaled between the flanges 76ª and 76ᵇ, and a spring 85 surrounding the pivot pin 84 presses the pawl 83 lightly against the ratchet teeth. The arm 75 has, at its free end, a roller 86 which projects through an opening 87 in the plate D, into position to be engaged by a cam 88 secured to the lower side of the gear 57 which carries the snail cam. The cam 88 is arranged close to the axis of the wheel 57 and it is so located that while the pin 55 on the lever 53 is moving from the high to the low part of the snail cam, the cam 88 will bear against the roller 86 and move the arm 75 relatively to the arm 76, such relative motion being permissible by reason of the pin and slot connection 78 and 79 between said arms. At this time the pawl 83 being in engagement with the ratchet wheel 81 the spring 80 will be compressed by the positive movement of the arm 75, and the arm 76 will be moved by the spring 80 in the direction to cause the pawl 83 to move the clock mechanism. By the time the pin 55 reaches the lowermost part of the snail cam, the roller 86 will have passed beyond the cam 88 and thus the tension on the spring 80 will be relieved so that this auxiliary spring will only operate while the pin 55 is moving from the high to the low part of the snail cam. The roller 86 is normally held in the path of movement of the cam 88 by a spring 89 which bears against the lever 75. By properly proportioning the parts the main and auxiliary springs will operate alternately one taking effect immediately when the other becomes inoperative. In the apparatus just described the lever 53 is normally pressed in the direction to hold the pin 55 against the surface of the snail cam by a spring 90.

For use on motor vehicles which travel at ordinary ranges of speed, the parts may be proportioned so that the snail cam will turn say thirty times in a mile or once for every 176 feet of travel of the vehicle and the main spring may be arranged so that it will, if stretched to its limit, "run down" in, say forty-five seconds, or less. So proportioned the main spring would be placed under tension and relaxed thirty times in a mile. As the tension is applied gradually and the clock mechanism is in motion while the tension is being applied, the spring is never stretched to its limit; therefore, should the vehicle stop the clock mechanism will thereafter, run for only a fractional part of the forty-five seconds, or say ten to fifteen seconds. The indicating hand 4 and register 6, operated by the time mechanism will therefore indicate very closely the actual number of hours the machine is in operation, without regard to the speed of the vehicle.

With the exception of the devices for applying power to the clock mechanism when the main spring is relaxed the details of the clutch device $f$, the guard 56ᵇ opposite the snail cam and the particular devices for resetting the time indicating hand, the time mechanism above described is not materially different from that disclosed in my Patent No. 903,793. The speed indicating devices also operate upon the same principle as disclosed in the above mentioned patent but the parts differ in some respects. In the drawings of the present application the hand 2 which indicates the speed of the vehicle is mounted upon a spindle 30 and a spiral spring 91 near the bottom of the spindle tends to rotate the spindle and hand in the direction to indicate high speed, while a pawl 92 pivoted on the plate D engages a ratchet wheel 93, secured to said spindle, and normally prevents the rotation of the spindle by the spring. A cam 94 is secured rigidly to the spindle 30, and moved in one direction by the spring 91 and in the opposite direction by projections upon the plate $f^2$ which is operated by the clock mechanism. The plate $f^2$, which has heretofore been referred to as a part of the clutch member F, has a curved arm 95 which is concentric with the axis of the spindle 10 and carries at its end a stop pin 96. When the clutch member is set back into its initial position, the edge 97 of the plate $f^2$ comes against an adjustable stop 98. When tension is applied to the main spring the plate $f^2$ rotates with the main gear 41 and the stop pin 96, upon the arm 95 moves synchronously with the gear 41, its path of movement being close to the shaft 30. Just before the pin 55 on the lever 53 reaches the high point on the snail cam, as shown in Fig. 6, a tripping pin 99 on the under side of the gear 57, engages the pawl 92 and moves said pawl out of engagement with the ratchet wheel 93, thereby allowing the spring 91 to swing the spindle 30 until the cam 94 strikes against the stop pin 96. The pin 99 then passes beyond the end of the pawl 92 and the latter reëngages the ratchet wheel 93, locking the spindle 30, which carries the cam 94 and the indicating hand 3 against further movement. The further movement of the vehicle or machine causes the pin 55 to move on to the low part of the snail cam and thereby the clutch member, which carries the pin 96, is reset in its initial position. As said member moves in synchronism with the time mechanism, while the tripping pin 99 releases the pawl 92 each time the vehicle or other machine moves unit distance, it will be seen that the cam 94 will be released through the agency of said tripping pin at varying intervals of time, depending upon the speed of the vehicle and that the stop pin 96 and cam 94 will, therefore, meet at different points in the travel of said pin 96. The indicator hand 3 will, therefore, indicate the average time consumed by the machine in traveling over a given unit of distance. If the machine travels very fast over one unit of distance, the pin 96 may only reach the position shown in Fig. 3, for instance, before the pin 99 trips the pawl 92, and thus the tapering end 94ᵃ of the cam 94 would swing into engagement with the pin 96 at an early point in the travel of said pin and the indicator hand 3 would indicate high speed. If during the next unit of distance, the machine travels very slowly, the stop pin 96 would engage the tapering end of the cam and move the cam against the action of the spring 91, to indicate the low speed, for that unit of distance. The instrument, for use on automobiles, is not intended to indicate speeds of less than five miles per hour, and therefore, at such low speeds the pin 96 may engage and move past the wedge like end 94ᵃ of the cam 94, and in order to continue the movement of the cam 94 so as to bring the pointer 3 back to the lowest point on the scale, a roller 100 is located on the plate $f^2$ in position to engage the surface 94ᵇ of the cam 94 and rock the latter until the pointer 3 comes to the left hand end of the scale, providing the speed is not above five miles per hour. If the speed is considerably above five miles per hour only the pin 96 will engage the cam 94; but for a slower speed the roller 100 operates upon the cam after the pin 96 has passed out of operative relation with the tapering part 94ᵃ.

In my prior patent, heretofore referred to, a stop pin corresponding to the stop pin 96 is carried upon a float lever connected to the driving clutch member and this pin acts upon a cam wheel, connected by gear to the shaft carrying the speed indicator arm. It will be seen that in the present invention the float lever is dispensed with and the stop pin 96 is upon an arm integral with the clutch member; also that the cam coöperating with said stop pin to position the indicator arm is connected directly to the shaft for the indicator arm, instead of being geared thereto. This gearing is dispensed with by arranging the pin 96 so that it travels close to the axis of the shaft 30 which carries the speed indicator arm.

What I claim is:—

1. In an instrument for indicating the speed or running time of a machine, a clock train, two springs adapted to operate alternately and independently for operating said train, and means operated by the machine to which the instrument is applied for applying tension to said springs.

2. In an instrument for indicating the speed or running time of a machine, the combination with a clock train, and a main spring for operating the same, of means operated by the machine to which the instrument is applied for alternately applying tension to the main spring and then permitting said spring to relax during fixed intervals in the travel of the machine, and means operated by the machine, independently of the main spring, for applying driving force to the clock train while the main spring is inoperative, during such intervals.

3. In an instrument for indicating the speed or running time of a machine, the combination with a clock train, and a main spring for operating the same, of means operated by the machine to which the instrument is applied for alternately applying tension to the main spring and then permitting said spring to relax during fixed intervals in the travel of the machine, and means operated by the machine for applying driving force to the clock train while the main spring is inoperative, during such intervals.

4. In an instrument for indicating the speed or running time of a machine, the combination with a clock train, a main spring and clutch adapted to operate the same while tension is being applied to the main spring, an auxiliary spring and clutch adapted to operate the clock train while the latter spring is relaxing, means operated by the machine to which the instrument is applied for simultaneously applying tension to said springs and then releasing the springs during fixed intervals in the travel of the machine.

5. In an instrument for indicating the speed or running time of a machine, the combination with a clock train having a main or driving shaft, and a toothed clutch wheel thereon, of a clutch member rotatable about the axis of said shaft, said member having a clutch for engaging the wheel comprising a pinion meshing with the clutch wheel a toothed wheel secured to the pinion and a pawl pivoted on said clutch member and engaging the teeth of said wheel, and means for oscillating said clutch member comprising a main spring for turning said clutch member in one direction, means operated by the machine to which the instrument is applied for putting said spring under tension, and means, also operated by said machine, for moving the clutch member in the opposite direction at fixed intervals in the travel of the machine.

6. In an instrument for indicating the speed or running time of a machine, the combination with a clock train, a clutch member for driving the same, a lever, a main spring connecting said lever with said clutch member, means operated by the machine to which the instrument is applied for oscillating said lever, a second lever pivoted upon said first mentioned lever and having a lost motion connection therewith, said second lever having a device for engaging a toothed wheel of the clock mechanism, and a spring for moving said second lever relatively to the first mentioned lever.

7. In a device of the kind described, the combination of a clock train, a clutch member for engaging and moving said train, a snail cam, a lever having a projection engaging said cam, a link and a main spring connecting said lever with the clutch member and a guard adjacent to the snail cam for engaging the projection on the lever while said projection is moving from the high to the low part of the cam.

8. The combination with a shaft or spindle having a speed indicating arm or device thereon, of a cam secured to said shaft, a spring normally tending to rotate said device to indicate high speeds, means for locking said device against rotation by the spring, a clock mechanism, a clutch member movable with said mechanism and having a stop adapted to engage said cam, and means operated by the machine to which the instrument is applied, at fixed intervals in the travel of the machine, for tripping said locking device and for resetting said clutch member in an initial position.

9. The combination with a shaft or spindle having a speed indicating arm or device thereon, of a cam secured to said shaft, a spring normally tending to rotate said device to indicate high speeds, means for locking said device against rotation by the spring, a clock mechanism, a clutch member movable with said mechanism and having an arm movable in a path close to said shaft and having a stop adapted to engage said cam, and means operated by the machine to which the instrument is applied, at fixed intervals in the travel of the machine, for tripping said locking device and for resetting said clutch member in an initial position.

10. The combination with a shaft or spindle having a speed indicating arm or device thereon, of a cam secured to said shaft, a spring normally tending to rotate said device to indicate high speeds, means for locking said device against rotation by the spring, a clock mechanism, a clutch member movable with said mechanism and having an arm movable in a path close to said shaft, said arm having a stop adapted to engage one side of said cam and said member having a part adapted to engage another side of said cam and means operated by the machine to which the instrument is applied, at fixed intervals in the travel of the machine, for tripping said locking device and for resetting said clutch member in an initial position.

In testimony whereof I affix my signature, in presence of two witnesses.

RALPH SHIPMAN.

Witnesses:
A. W. PONTIUS,
W. E. ZARTMAN.

---

Copies of this patent may be obtained for five cents each, by addressing the "Commissioner of Patents, Washington, D. C."